(12) United States Patent
von Duhn et al.

(10) Patent No.: US 7,844,586 B2
(45) Date of Patent: Nov. 30, 2010

(54) METHODS AND SYSTEMS IN MONITORING TOOLS FOR EFFECTIVE DATA RETRIEVAL

(75) Inventors: Jörg von Duhn, Schwetzingen (DE); Iain Morrison, Karlsruhe (DE)

(73) Assignee: SAP, Walldorf (DE)

( * ) Notice: Subject to any disclaimer, the term of this patent is extended or adjusted under 35 U.S.C. 154(b) by 1432 days.

(21) Appl. No.: 10/812,992

(22) Filed: Mar. 31, 2004

(65) Prior Publication Data

US 2005/0222974 A1 Oct. 6, 2005

(51) Int. Cl.
G06F 17/30 (2006.01)
(52) U.S. Cl. .................................. 707/705; 707/602
(58) Field of Classification Search .................. None
See application file for complete search history.

(56) References Cited

U.S. PATENT DOCUMENTS

| | | | |
|---|---|---|---|
| 5,146,578 A | | 9/1992 | Zangenehpour |
| 5,317,727 A | | 5/1994 | Tsuchida et al. |
| 5,666,526 A | * | 9/1997 | Reiter et al. ............. 707/2 |
| 5,761,655 A | | 6/1998 | Hoffman |
| 5,887,151 A | | 3/1999 | Raz et al. |
| 5,896,548 A | | 4/1999 | Ofek |
| 6,275,852 B1 | * | 8/2001 | Filepp et al. ............. 709/220 |
| 6,567,894 B1 | | 5/2003 | Hsu et al. |
| 2001/0027418 A1 | * | 10/2001 | Johnson ..................... 705/22 |
| 2002/0107835 A1 | * | 8/2002 | Coram et al. ............... 707/1 |
| 2002/0128899 A1 | * | 9/2002 | Collings et al. ........... 705/10 |
| 2004/0032432 A1 | * | 2/2004 | Baynger ................... 345/810 |

* cited by examiner

*Primary Examiner*—Mohammad Ali
*Assistant Examiner*—Syed H Hasan
(74) *Attorney, Agent, or Firm*—Finnegan, Henderson, Farabow, Garrett & Dunner, LLP (57) ABSTRACT

Systems and methods are provided for accessing and presenting data in real-time. In one exemplary embodiment, the systems and methods may include presenting a first record set, fetching a second record set before a data request, and presenting the second record set in response to the data request. The first record set may be associated with at least one of a first part monitored by the monitoring system, a first location of the first part, and a first supplier of the first part. The second record set may be associated with at least one of a second part monitored by the monitoring system, a second location, and a second supplier.

29 Claims, 8 Drawing Sheets

Selection — 402

Search | Show enhanced selection | Save Selection | Cancel | Set notification

Selection name: SEL1

Access level: User specific selection

Default Selection ☐

Part: P  To: Q

Location:  To:

Button 1 | Button 2

| Supplier | Product | Location | Demand Freq. | Req.Status | Emerg.Order | Backorder | DoH |
|---|---|---|---|---|---|---|---|
| S1 | P1 | L1 | 450 | REQ | 2 | 250 | -5 |
| S2 | P1 | L2 | 400 | REQ | 1 | 240 | -3 |
| S2 | P2 | L1 | 356 | AN | 0 | 0 | 1 |
| S2 | P11 | L1 | 255 | AN | 0 | 0 | 2 |
| S2 | P13 | L2 | 238 | AN | 0 | 0 | 4 |
| S2 | P4 | L3 | 87 | REQ | 0 | 0 | 2 |
| S3 | P6 | L4 | 50 | REQ | 0 | 0 | 4 |
| S3 | P2 | L5 | 40 | REQ | 0 | 0 | 4 |

404

REFRESH — 410
PREV — 408
NEXT — 406

| Product | Location | Supplier | ... |
|---------|----------|----------|-----|
| P1 | L1 | S2 | ... |
| P1 | L2 | S2 | ... |
| P1 | L3 | S2 | ... |
| P1 | L4 | S2 | ... |
| P1 | L5 | S2 | ... |
| P1 | L6 | S2 | ... |
| P1 | L7 | S2 | ... |
| P1 | L20 | S4 | ... |
| P1 | L21 | S4 | ... |
| P1 | L23 | S2 | ... |

FIG. 8A

| Product | Location | Supplier | ... |
|---------|----------|----------|-----|
| P1 | L1 | S2 | ... |
| P1 | L2 | S2 | ... |
| P1 | L3 | S2 | ... |
| P1 | L4 | S2 | ... |
| P1 | L5 | S2 | ... |
| P1 | L6 | S2 | ... |
| P1 | L7 | S2 | ... |
| P1 | L20 | S4 | ... |
| P1 | L21 | S4 | ... |
| P1 | L23 | S2 | ... |

FIG. 8B

METHODS AND SYSTEMS IN MONITORING TOOLS FOR EFFECTIVE DATA RETRIEVAL

BACKGROUND OF THE INVENTION

I. Technical Field

The present invention generally relates to methods and systems for accessing and presenting data. More particularly, the invention relates to methods and systems in which data may be accessed from one or more databases in real-time to facilitate, for example, shortage monitoring in a supply chain management system.

II. Background and Material Information

In today's world of business, with global competition running rampant and consumer expectations ever-increasing, the efficiency of a business enterprise is becoming more important than ever. No longer will a consumer accept any delay in satisfying their mounting appetite for goods and services. They want their goods and services immediately, and in addition, demand the highest quality at the lowest cost. Hence, many businesses use supply chain management to control and optimize their production and cost.

Supply chain management is a set of approaches and processes for efficiently integrating suppliers, manufacturers, warehouses, and stores, so that merchandise is produced and distributed at the right quantities, to the right locations, and at the right time, in order to minimize system-wide cost while satisfying service level requirements. A supply chain is a network of facilities and distribution options that procures and acquires material, processes and transforms the material into intermediate and finished products, and distributes the finished products to customers, whether intermediate or final ones. Supply chains exist both in manufacturing as well as in service organizations.

Currently, technology is available to help manage a business's supply chain. However, as the needs of a large and growing business increase, more is expected for the business to stay competitive and fewer disruptions in the business's supply chain are tolerated. This is because any disruption can have extremely negative consequences on the business's reputation, market share, profitability, and ultimately, survivability. Particularly, shortages of parts or services in the supply chain can have immense impact on the efficiency of the business, including creating delays or even complete stoppages of the business's production.

Accordingly, it would be beneficial to facilitate the management of supply chains, and in particular, facilitate real-time monitoring of parts or services in the supply chain. Moreover, it would be beneficial to access data in real-time to facilitate supply chain management including, for example, monitoring and managing supply shortages.

SUMMARY OF THE INVENTION

Methods, systems, and articles of manufacture consistent with the present invention may facilitate the access of data. More particularly, methods, systems and articles of manufacture consistent with the invention facilitate data access, whereby the data may be accessed in real-time from one or more databases to perform, for example, shortage monitoring in a supply chain management system.

One exemplary aspect of the invention relates to a method for presenting data in a monitoring system in real-time. The method may include: presenting a first record set; fetching a second record set before a data request; and presenting the second record set in response to the data request. The first record set may be associated with at least one of a first part monitored by the monitoring system, a first location of the first part, and a first supplier of the first part. The second record set may be associated with at least one of a second part monitored by the monitoring system, a second location of the first part, and a second supplier of the first part.

Another exemplary aspect of the invention relates to a method for presenting data in real-time. The method may include presenting a first record of a plurality of records; fetching a second record from the plurality of records before receiving a data request for the second record; and presenting the fetched second record in response to receiving the data request. The first record may include at least one of a first part, a first location, and a first supplier. The second record may include at least one of a second part, a second location, and a second supplier.

Another exemplary aspect of the invention relates to a method for presenting data in a monitoring system in real-time. The method may include: presenting a first record set in response to a data query in a monitoring system; fetching a second record set before receiving a data request; and presenting the second record set in response to receiving the data request. The second record set may contain a more current version of at least one record in the first record set.

Another exemplary aspect of the invention relates to a monitoring system. The monitoring system may include a processor and a memory configured to perform a method for presenting data in real-time.

Another exemplary aspect of the invention relates to a computer-readable medium containing instructions to configure a monitoring system to perform a method for presenting data in real-time.

Another exemplary aspect of the invention relates to a user interface for presenting data in real-time.

Additional aspects of the invention are set forth in the detailed description which follows or may be learned by practice of methods, systems, and articles of manufacture consistent with the present invention. It is understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. In the drawings.

DETAILED DESCRIPTION

Reference is now made in detail to exemplary aspects of the invention, examples and embodiments of which are illustrated in the accompanying drawings. Wherever possible, the same reference numbers are used throughout the drawings to refer to the same or like parts.

For the purposes of this application, the supply, production, and distribution of automotive products are discussed. However, as one of ordinary skill in the art will appreciate, the supply, production, and distribution of other products and services, such as computers, televisions, tools, and other items of commerce, may also follow the same or similar course to the marketplace. Accordingly, features and principles of the present invention are not limited to the supply chain (e.g., supply, production, and distribution) of automotive products, but are equally applicable to other products and services placed in commerce.

Figure 1:
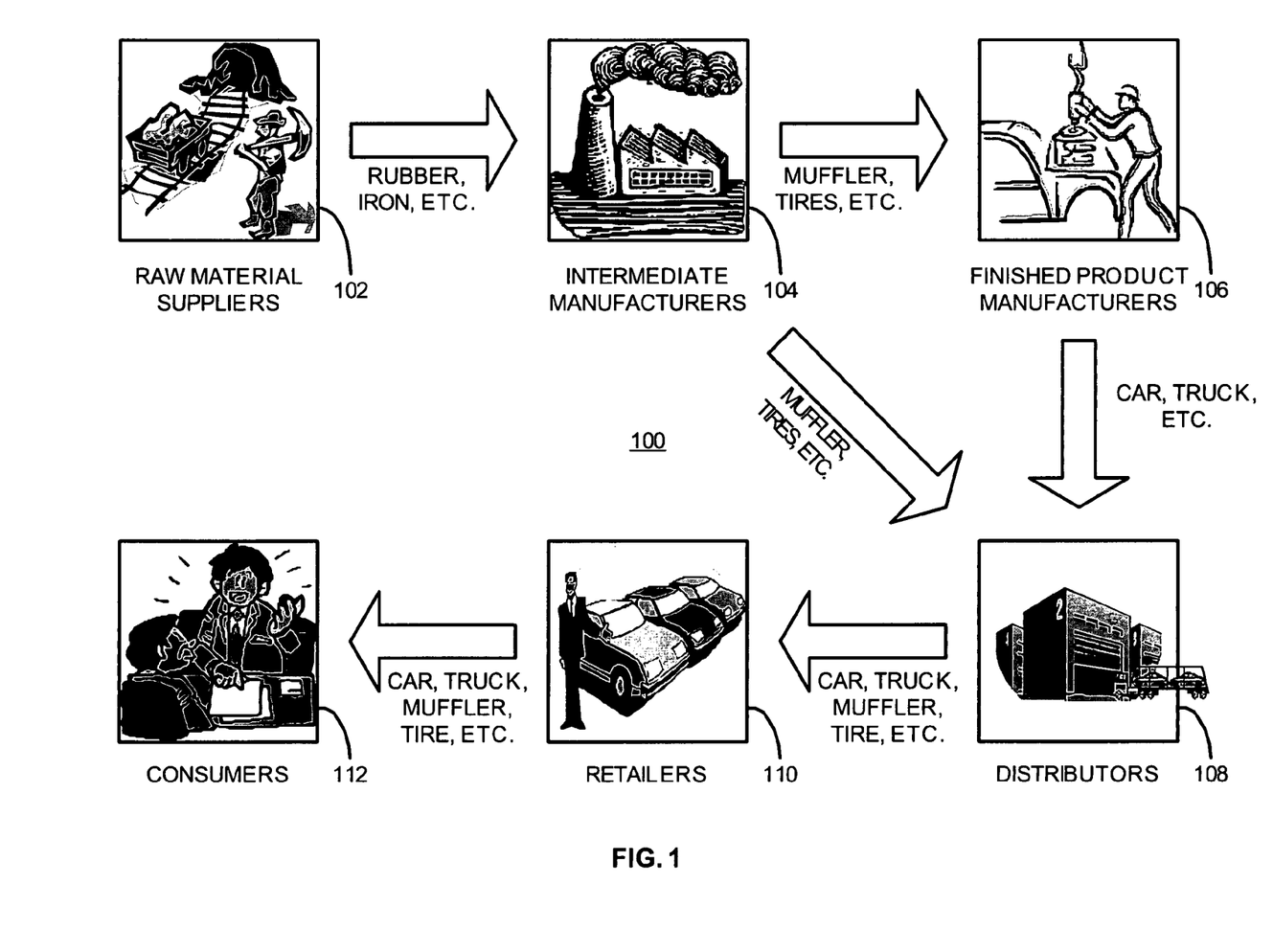
FIG. 1 illustrates an exemplary supply chain environment consistent with the present invention.

FIG. 1 illustrates an exemplary supply chain environment 100 for automotive parts, consistent with features and principles of the present invention. Supply chain 100 may include raw material supplier(s) 102, intermediate manufacturer(s) 104, finished product manufacturer(s) 106, distributor(s) 108, retailer(s) 110, and consumer(s) 112. Raw material suppliers 102 may furnish basic materials (e.g., rubber, iron, glass, etc.) to intermediate manufacturers 104. From the basic materials, intermediate manufacturers 104 may produce intermediate products or parts (e.g., tires, mufflers, windshields, etc.) for finished product manufacturers 106 or distributors 108. Using the intermediate products, finished product manufacturers 106 may manufacture finished products (e.g., cars, trucks, motorcycles, etc.) for distributors 108. Distributors 108 may supply retailers 110 with the intermediate or finished products, and retailers 110 may sell them to consumers 112.

Each stage 102-112 of supply chain 100 may involve many suppliers providing their respective products or services to the next stage. For example, there may be hundreds of intermediate manufacturers 104 that produce similar or different parts, which finished product manufacturers 106 may use as needed to produce its finished products. Hence, each stage 102-112 of supply chain 100 may include multiple redundant suppliers of a particular part or product.

As one of ordinary skill in the art will appreciate, each stage 102-112 may depend on the availability of parts or products from a previous stage. For example, if a part is not timely available from any stage 102-104, then finished product manufacturer 106 may have a shortage of parts necessary to produce its finished products. The part may be something as unremarkable as a fastener for a muffler. However, without the missing part, finished product manufacturer 106 can not complete assembly of its finished product (e.g., automobile), which creates shortage problems that are cascaded to later stages 108-112. At this point, the availability of backup suppliers and emergency suppliers for stages 102 and 104 would be useful in maintaining the stock of available parts to finished product manufacturer 106.

Figure 2:
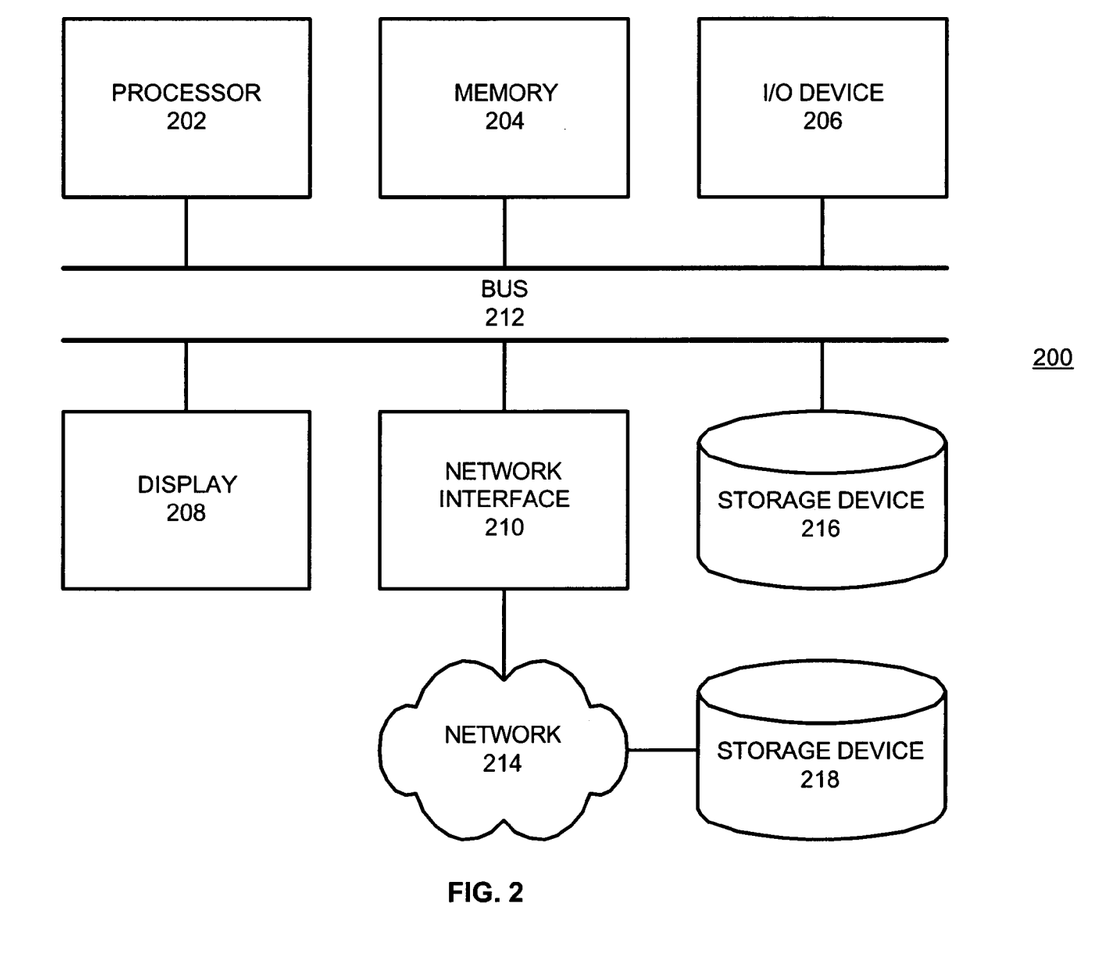
FIG. 2 illustrates an exemplary shortage management monitoring system consistent with the present invention.

In one exemplary embodiment consistent with the present invention, shortages in a supply chain may be monitored and controlled using a shortage management monitor system, such as the exemplary monitor system 200 illustrated in FIG. 2. Monitor system 200 may watch over critical (i.e., out-of-stock) parts, potentially critical (i.e., low supply) parts, and remaining parts for a business's production line and its suppliers. The business and its suppliers may use monitor system 200 to take immediate action on shortage parts and to take preventive action on potential shortage parts. Monitor system 200 may display different internal and external information for the business and suppliers, respectively, and may use a login interface to differentiate between the two. The business may use monitor system 200 to view parts information, and the suppliers may use monitor system 200 to enter promises, a delivery schedule, and/or remarks for the parts.

Monitor system 200 may include a processor 202, a memory 204, an input/output (I/O) device 206, a display 208, a network interface 210, a bus 212, a network 214, and one or more persistent storage devices 216 and 218. Processor 202, memory 204, I/O device 206, display 208, network interface 210, and storage device 216 may be configured to communicate over bus 212. Storage device 218 and network interface 210 may be configured to communicate over network 214. In one exemplary embodiment, monitor system 200 may be incorporated into a parts planning system, such as the Advanced Planning Optimizer (APO) available from SAP AG (Walldorf, Germany).

Processor 202 may include a mainframe, a laptop, a personal computer, a workstation, a computer chip, a digital signal processor board, an analog computer, a plurality of processors, or any other information processing device or combination of devices. Further, processor 202 may be implemented by a general purpose computer or data processor selectively activated or reconfigured by a stored computer program, or may be a specially constructed computing platform for carrying out the features and operations disclosed herein. Memory 204 may include random access memory, read-only memory, flash memory, or any other information storage device. I/O device 206 may include a keyboard, a mouse, a trackball, a light pen, an electronic tablet, or any other mechanism that can provide information to monitor system 200. Display 208 may include a cathode-ray-tube monitor, a plasma screen, a liquid-crystal-display screen, or any other device for conveying information from monitor system 200. Network interface 210 may include an Ethernet card, a FDDI card, a modem, or any other mechanism for interfacing to a network. Bus 212 may include a data cable, a circuit board connection, a fiber optic line, a network, a serial connection, a parallel connection, or any other mechanism for conveying information between processor 202, memory 204, I/O device 206, display 208, network interface 210, and/or storage device 216. Network 214 may include a local area network, a wide area network, an intranet, an extranet, the Internet, a telephone network, a wireless network, a wired network, or any other means for communicating between locations. Storage devices 216 and 218 may include a hard drive, a tape drive, a RAID disk array, a database system, a optical disk drive, or any other device or system that persistently stores information.

Figure 3:
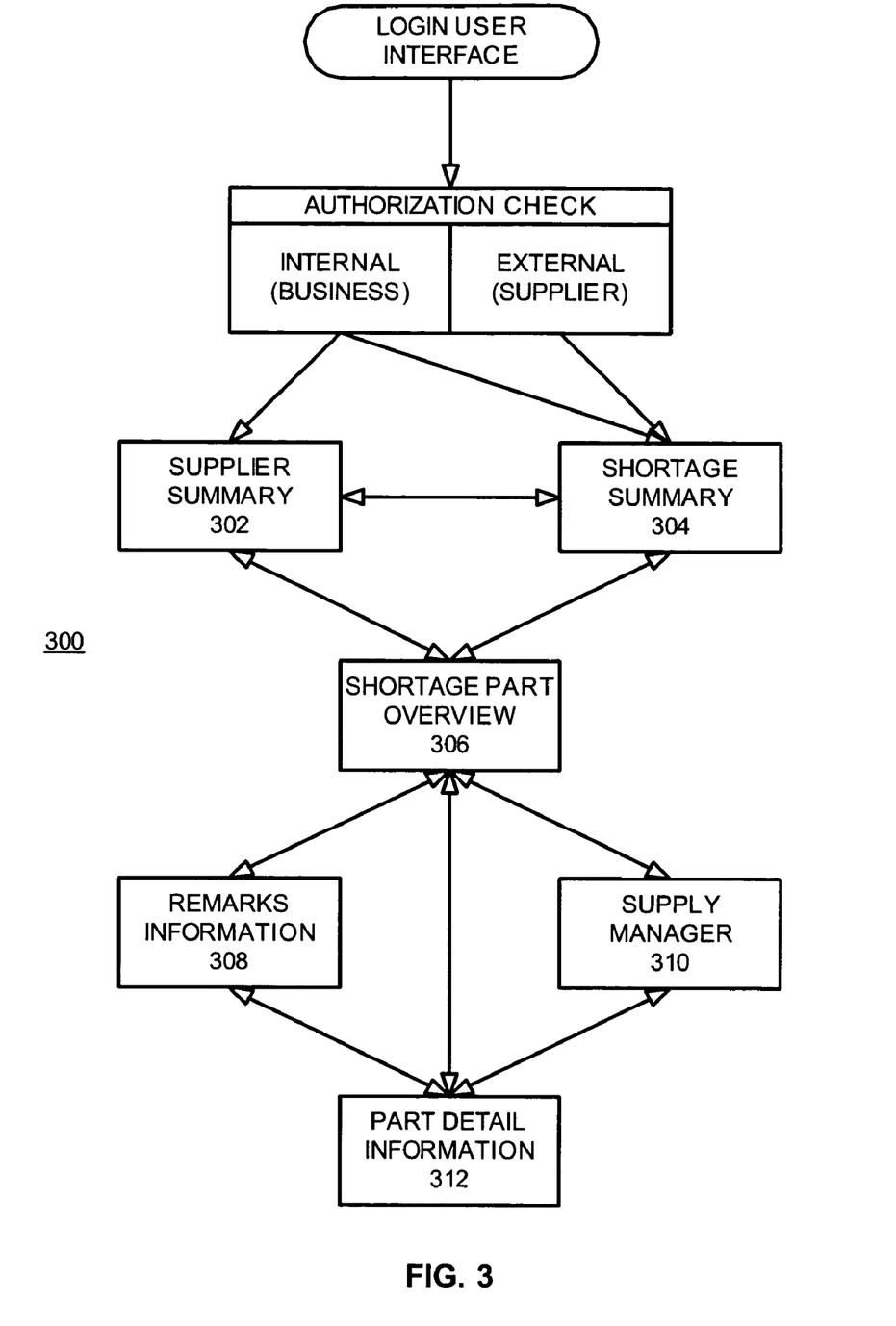
FIG. 3 illustrates exemplary shortage monitor interface elements consistent with the present invention.

In one exemplary embodiment consistent with the present invention, monitor system 200 may be configured with shortage monitor elements, such as shortage monitor elements 300 illustrated in FIG. 3, to manage a business's supply chain and shortages of supplier parts. Elements 300 may be a set of different screens or user interfaces and may include a supplier summary 302, a shortage summary 304, a shortage part overview 306, a remarks information view 308, a supply manager 310, and/or a part detail information view 312. Elements 300 may act as interfaces to database(s) of parts or supplier information for the business and may be used to determine, analyze, and forecast shortages of parts. Further, an internal user may navigate between elements 300 to obtain information about a part. Suppliers may also access portions of elements 300, analyze parts that they supply to the business and are responsible for, and send promises and/or advanced shipping notifications (ASN) on critical or potentially critical parts, thus helping to avoid shortages for parts that they provide.

Elements 300 may be implemented in software or firmware, such as HTML, Java, Visual Basic, C, COBOL, FORTRAN, assembly language, machine code, and/or any other programming language.

Supplier summary 302 may show a view of all suppliers that supply a selected part and may list supplier information (e.g., supplier identification or name, number of back order lines, quantity of back order pieces available or on order, number of emergency order lines, quantity of emergency order pieces available or on order, etc.). Shortage summary 304 may summarize information on all parts matching a query (e.g., a request for parts ranging between P and Q, at locations L1 to L2, etc.). Shortage part overview 306 may allow a user to analyze shortages by parts and location of the parts or by status of orders to suppliers (e.g., part delivery scheduled, part delivery late, etc.). Remarks information view 308 may list simple remarks (e.g., text) entered by a user for specific parts. The remarks may be dated, time-stamped, and hidden or unhidden from suppliers that use monitor system 200. Supply manager 310 may allow a supplier with valid authorization to enter a supplier promise for a part, including a part quantity and ship date. Part detail information view 312 may show detailed data for a part, such as part master data, stock information, demand and forecast information, remarks, distribution requirements planning (DRP) information, schedule information, ASN information, order information, lead-time information, supplier promises, supplier information, etc.

Figure 4:
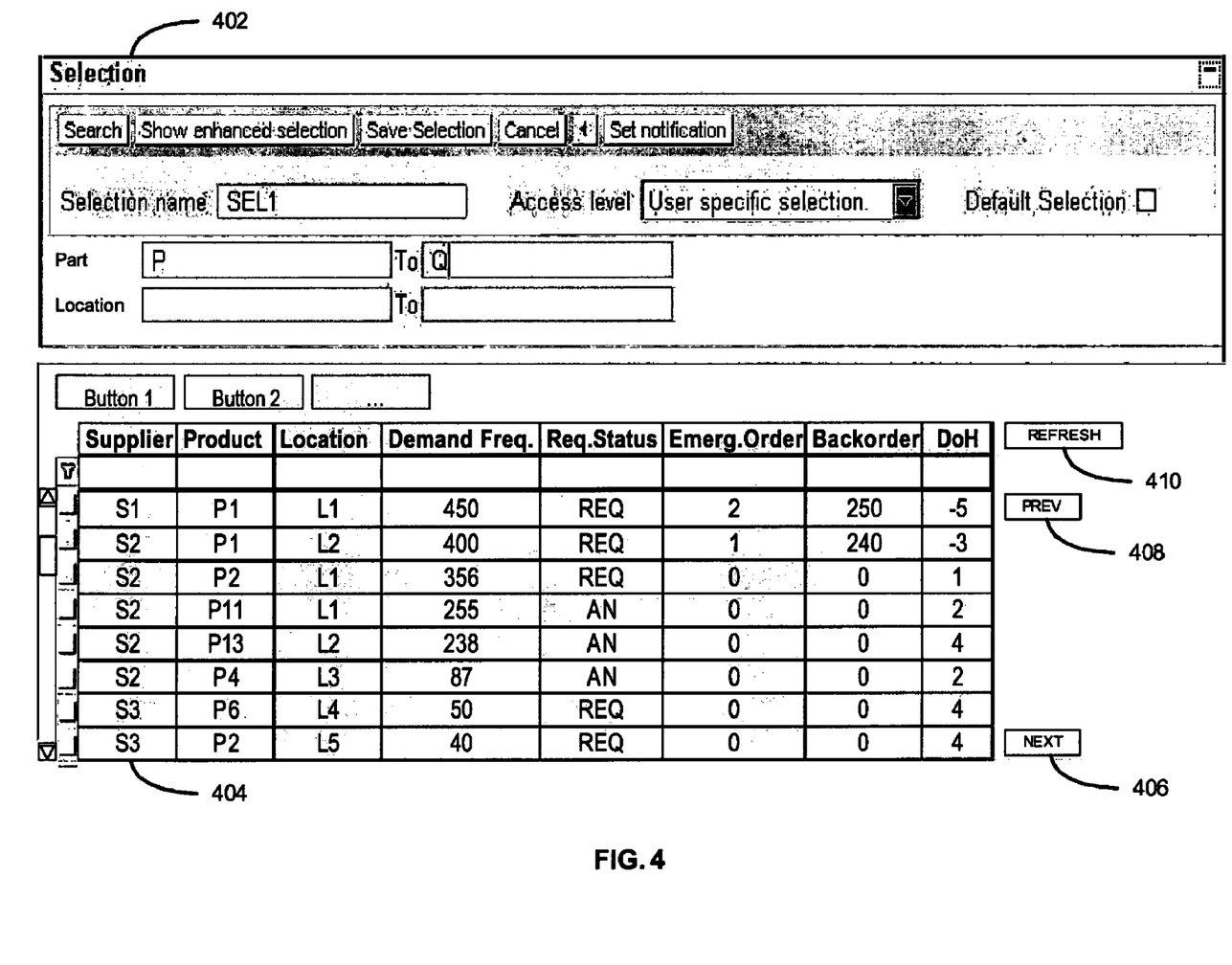
FIG. 4 illustrates exemplary selection and results areas consistent with the present invention.
Figure 5A:
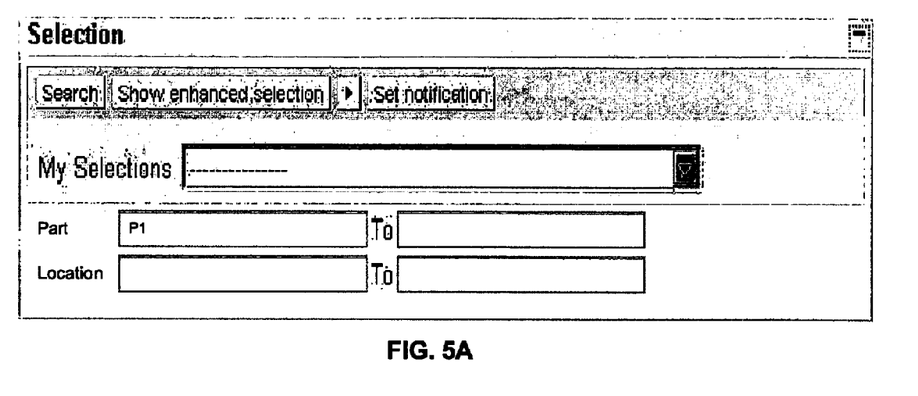
FIGS. 5A-5C illustrate exemplary selection interface areas consistent with the present invention.
Figure 5B:
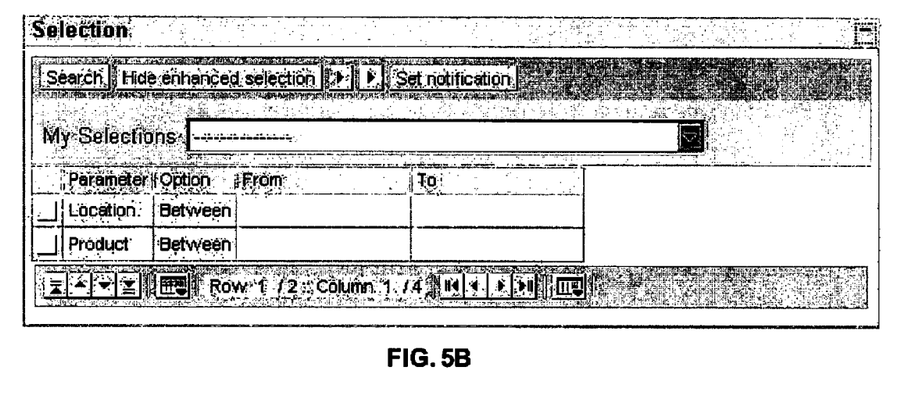
Figure 5C:
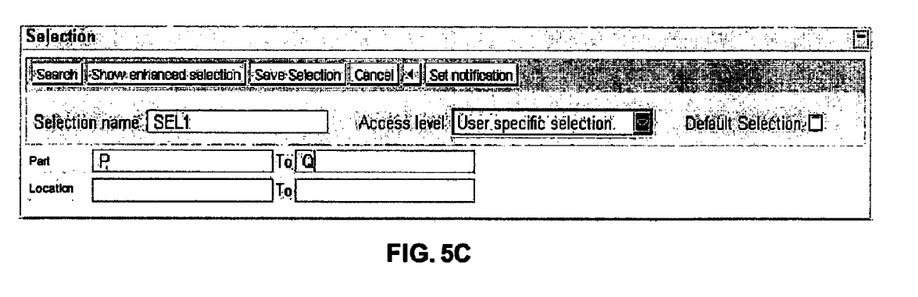

In general, each of elements 300 may include selection and results areas, such as the selection area 402 and a results area 404 illustrated in FIG. 4. Selection area 402 may accept selections (i.e., queries) from users for specific part order information stored in storage devices 216 and 218 (FIG. 2) and/or other databases. Selection area 402 may include a simple selection interface (see, e.g., FIG. 5A) or an advanced selection interface (see, e.g., FIG. 5B). The simple selection interface may allow a user to specify supplier product(s) or location(s) with supplier products that the user wishes to monitor or obtain information on. The advanced selection interface may allow the user to make more complex selections (e.g., parts or locations between, not between, or not equal to user-defined parameter values). Selections may be preconfigured and saved for later use via a selection creation interface (see, e.g., FIG. 5C). The saved selections may have different access levels to limit their availability to qualified users (e.g., administrator level, specific user, etc.) or may be a default selection.

When a user enters a selection in selection area 402 (FIG. 4), monitor system 200 (FIG. 2) may fetch parts and order information, from storage devices 216 and 218 (and/or other databases), that match the selection and display them to the user. The output results (i.e., the parts and order information) of the selection may be displayed in results area 404. For example and as shown in FIG. 4, the output results may include a list of suppliers, products supplied by the suppliers, locations of the products, frequency of demand for the products, requisition status of the products, number of emergency orders, number of back orders, days on hand (DoH), or any other information. Monitor system 200 may present the output results in tabular, list, or any other form.

In many cases, the number of parts and order information meeting the query's criteria may exceed the available space to display the information in results area 404. Indeed, the number of parts may number in the hundreds, thousands or even millions. Hence, monitor system 200 may only display a portion of the parts and order information meeting the query's criteria, such as that displayed in the example of FIG. 4.

Figure 6:
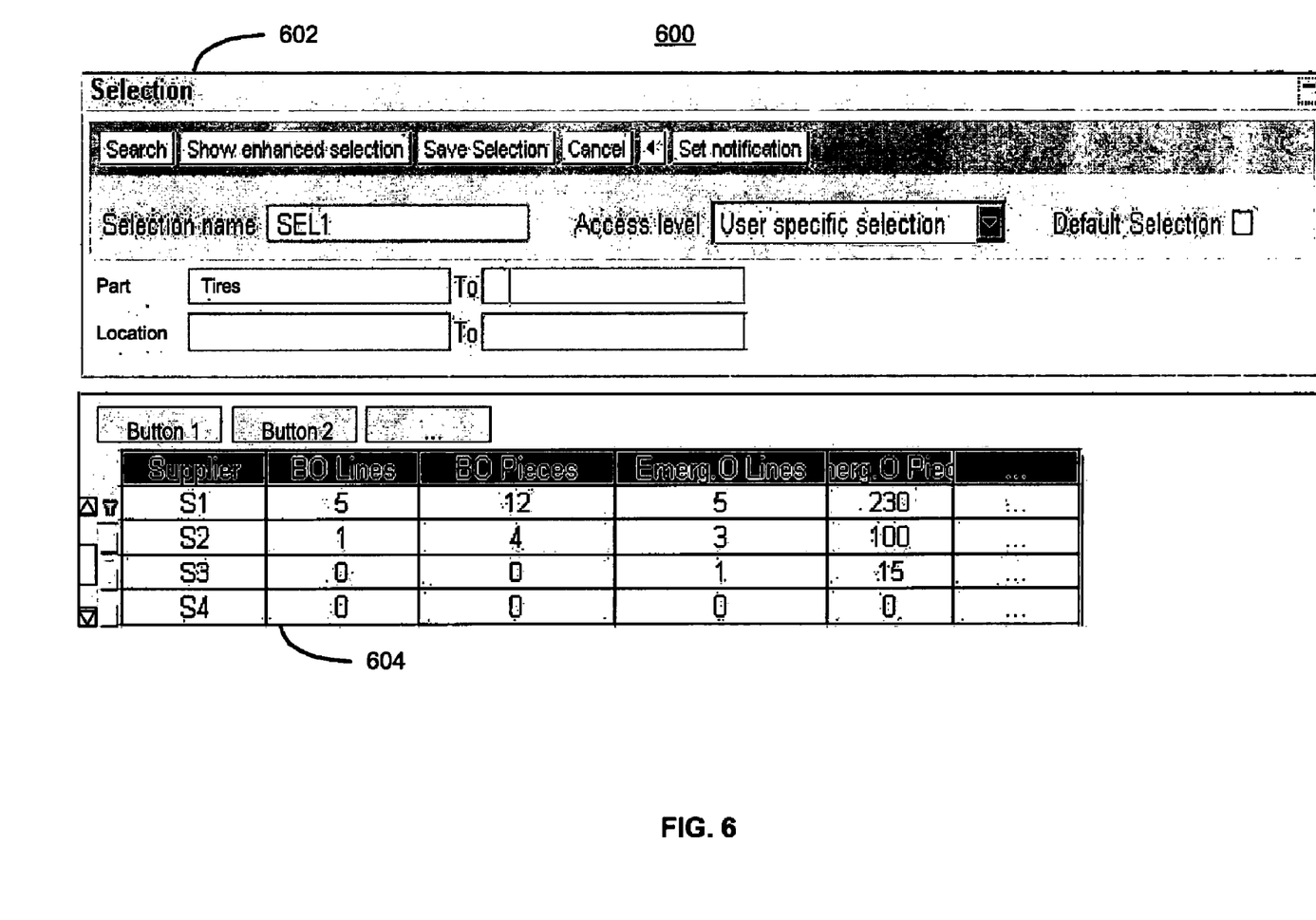
FIG. 6 illustrates an exemplary supplier summary consistent with the present invention.

In another example, as illustrated in a detailed view 600 (FIG. 6) of supplier summary 302 (FIG. 3), a user may enter selection criteria in the selection area 602 for supplier summary 302. The selection criteria may be a search for specific tire parts. After monitor system 200 fetches the information matching the criteria, supplier summary 302 may show a list of all suppliers that supply the specific tire parts and may list supplier information in its result area 604. The supplier information may include supplier names, number of back order lines, number of back order pieces, number of emergency order lines, number of emergency order pieces, etc. Particularly, as shown in FIG. 6, supplier S1, S2, S3, and S4 may be listed to have back orders of five, one, zero, and zero tires, respectively. If the amount of requested information will exceed the display in result area 602, monitor system 200 may only just fetch enough information to fill results area 602 and collect additional information for a next screen of information in real-time as the user makes data requests when navigating through the information.

In large and fast-paced businesses with extremely large numbers of suppliers and parts, parts information may easily be outdated because the parts information may be in a constant state of flux. Moreover, the parts information may be distributed across several databases making it difficult to fetch and display accurate parts information. By collecting and displaying information in real-time, as needed, and as the user navigates through the information, monitor system 200 may provide the most up-to-date information to the user. For example, many users may be concurrently accessing and modifying parts information stored in monitor system 200. If a user makes a request for parts information via selection area 402 (FIG. 4) and receives all information matching his criteria whether or not all the information can be displayed at once in results area 404, then as the user navigates through the fetched version of the information to view each portion of the information, the user has no idea whether the fetched version still reflects the parts information stored in monitor system 200 or some other location. This is because the fetched version may be sitting in memory while other users are modifying or have modified a master version of the parts information stored in monitor system 200 or at databases at some other locations.

However, if monitor system 200 only fetches enough information from storage devices 216 and 218 as can be displayed (e.g., a predetermined number of entries or record set that can be displayed) and then fetches additional information as the user scrolls or pages through the information, then monitor system's 200 response time to the user may appear sluggish. That is, in a system with a very large amount of parts and supplier information, each fetch may require a noticeable amount of time to complete because of the sheer size of information that needs to be examined and the database(s) that need to be accessed. For example, a car may have millions of part entries from thousands of suppliers. Hence, if monitor system 200 synchronously fetches additional information after or immediately after a user indicates he wishes to see the additional information, then the user may notice an unacceptable delay before receiving the additional information. A compromise between fetching too much information (e.g., all information meeting selection criteria) and too little information (e.g., only one line of information meeting selection criteria) for display may be appropriate.

Figure 7:
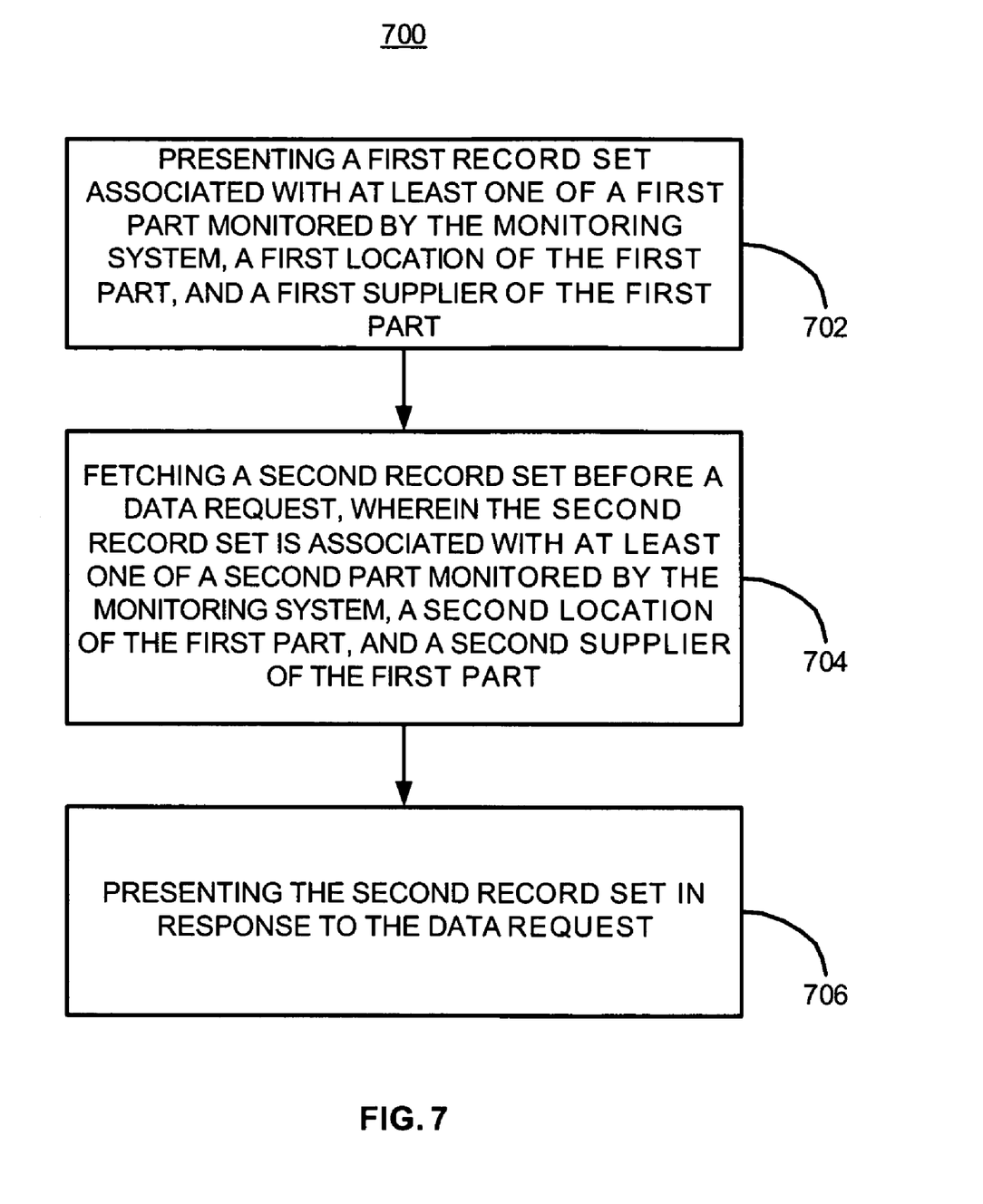
FIG. 7 illustrates an exemplary method for accessing and presenting data in real-time consistent with the present invention.

In one exemplary embodiment consistent with the present invention, a method 700 for accessing and presenting data in monitoring system 200 is provided. As illustrated in FIG. 7, method 700 may include presenting a first record set associated with at least one of a first part monitored by a monitoring system (such as monitoring system 200), a first location of the first part, and a first supplier of the first part (step 702). Referring to the exemplary embodiment of FIG. 4, the first record set may include parts, locations, suppliers, or any other associated information fetched according to a user data query entered in selection area 402. For example, FIG. 4 shows that the first record set includes a record with a first part P1, a first location L1, and a supplier S1. Portions or all of the first record set may be displayed in results area 404 as a current page. For example, results area 404 depicts a first record set including eight lines of supplier information.

Moreover, method 700 may include fetching from one or more databases or storage devices (such as storage devices 216 and/or 218) a second record set before a data request from the user (step 704). The second record set may be associated with at least one of a second part monitored by monitoring system 200, a second location, and a second supplier. The second record set may include parts, locations, suppliers, or any other associated information. For example, the second record set may include additional parts, suppliers, and/or locations. Monitor system 200 may fetch the second record set over bus 212, network 214, or via any other communication mechanism. Monitor system 200 may fetch the second record set (step 704) at the same time or substantially in parallel with fetching or presenting the first record set (step 702). For example, monitor system may fetch the second record set from storage devices 216 and 218 while it is fetching or presenting the first record set, or immediately thereafter. The second record set may be information just before and/or after the information currently presented in results area 404, such as the previous and/or next eight lines (not shown) of supplier information.

Furthermore, as illustrated in FIG. 7, method 700 may include presenting the second record set in response to a data request (step 706). The data request may be any user input (e.g., mouse click, keystroke(s), etc.) that the user provides to monitor system 200 to signal a desire to view additional data matching the user's data query. Presenting the second record set may include displaying portions or all of the second record in results area 404 as a previous line item or a next line item in the current page or as a previous or a next page. If results area 404 displays the first record set in a scrolling window format, then the data request may be in the form of a scroll command by a user operating a mouse, as shown in FIG. 4. Additionally or alternatively, the data request may be in the form of a next page command via a next button 406, a previous page command via a previous button 408, or any other suitable user interface input from the user.

By way of example, in one exemplary embodiment, a user may wish to see all records pertaining to P1 (i.e., the selection criteria). The user may do this by entering a data query with his selection criteria into a selection area, such as the one illustrated in FIG. 5A. In response, system 200 (FIG. 2) may search for all records meeting the selection criteria (i.e., all records regarding P1). System 200 may determine, for example, that there are ten records on storage devices 216 and/or 218 that match the selection criteria, as illustrated in the exemplary embodiment of FIG. 8A. However, a results area may only have enough space to display a limited number of records, such as four records at a time. Hence, system 200 may only fetch the first four records 802 as a first record set from storage devices 216 and/or 218, and display them in the results area. At substantially the same time that the first four records are fetched and/or before the a user makes a data request for the next four records, system 200 may fetch the next four records 804 as a second record set from storage devices 216 and/or 218. When the user makes a data request (e.g., by clicking a next page button) to see the next four records 804, system 200 will already have the data ready and may instantly display records 804 with minimal delay, as shown in the exemplary embodiment of FIG. 8B.

Records and information stored on storage devices 216 and/or 218 may constantly be in a state of flux. Anytime a user requests information matching his criteria, from storage devices 216 and/or 218, the information may quickly be outdated because it is being updated/changed even as the user is requesting and viewing the requested information. Hence, after system 200 fetches a second record set (step 704 in FIG. 7) from storage devices 216 and/or 218, the information in the second record set may become outdated by the time the user finishes viewing the first record set and makes a data request (e.g., clicks next page) to view the second record set. To address this problem, system 200 may maintain a time-stamp on the second record set, keep a timer to indicate the age of the second record set, and/or use any other mechanism to determine whether the second record set is outdated.

If system 200 determines from the time-stamp or timer that the second record set is too old, system 200 may re-fetch the second record set from storage devices 216 and/or 218 and display the re-fetched second record set instead of displaying the outdated version that it had already fetched. System 200 may determine whether the second record set is outdated and re-fetch the second record set, when the user makes a data request to view the second record set. Even if the user does not make a data request to view the second record set, system 200 may determine whether the second record set is outdated and re-fetch the second record set, after a predetermined time period has elapsed or some other condition has occurred.

For example, as discussed above for FIG. 8A, system 200 may fetch records 802 and 804 for the first and second record sets, respectively. However, if system 200 determines that the second record set has become outdated for some reason (e.g., a user views the first record set for a very long time before moving on to view the second record set on a next page), then when the user makes a data request to view the second record set, system 200 may re-fetch the second record set and display the re-fetched second record set instead of the previously fetched second record set. Of course, as system 200 is fetching the second record set, it may also fetch a third record set for the page of records following the second record set, in anticipation of the user's next data request (e.g., another next page command).

In one exemplary embodiment, the first record set and second record set may be for the same fields of data, but the second record set is an updated version of the first record set. For example, as illustrated in FIG. 4, a user may request supplier information for parts P to Q. System 200 may determine that their are 40 records that match the user's selection criteria. System 200 may fetch only eight out of the 40 records as a first record set from memory 204, storage device 216, and/or storage device 218 because results area 404 can only display eight records at a time. However, it may be known that the first record set contains outdated data or that the first record set contains records that are regularly changed/updated.

Hence, system 200 may also fetch a second record set, from storage devices 216 and/or 218, that contains an updated version of the records in the first record set. System 200 may fetch the second record set before the user makes a data request (e.g., click refresh button 410 in FIG. 4, etc.) to refresh the display. When the user decides to view the updated version of the records in the first record set, he may make a data request to refresh the display of the first record set with the second record set. In this manner, system 200 may provide a relatively quick response to the user's initial request for information by providing possibly outdated data from the first record set, and may again provide another quick response, when the user makes a data request to refresh the view of records from the first record set with updated versions from the second record set.

Figure 8A:
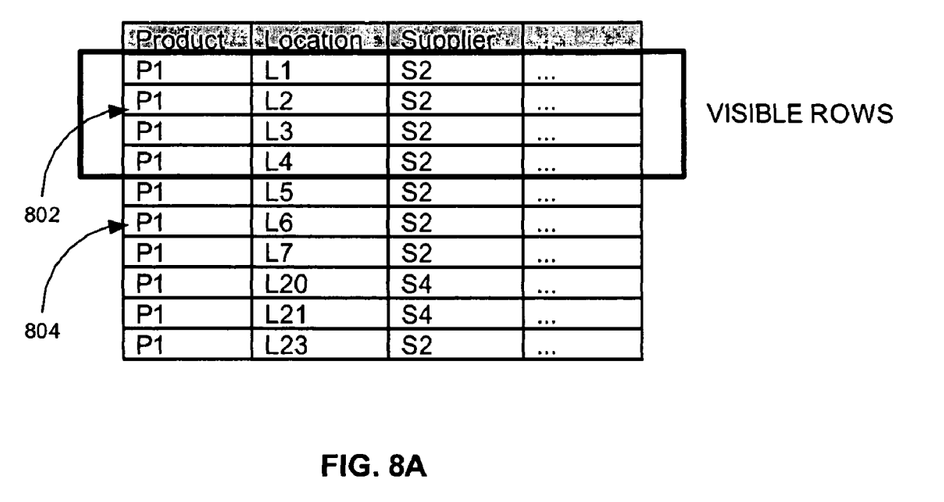
FIGS. 8A and 8B illustrate exemplary presentations of first and second record sets consistent with the present invention.
Figure 8B:
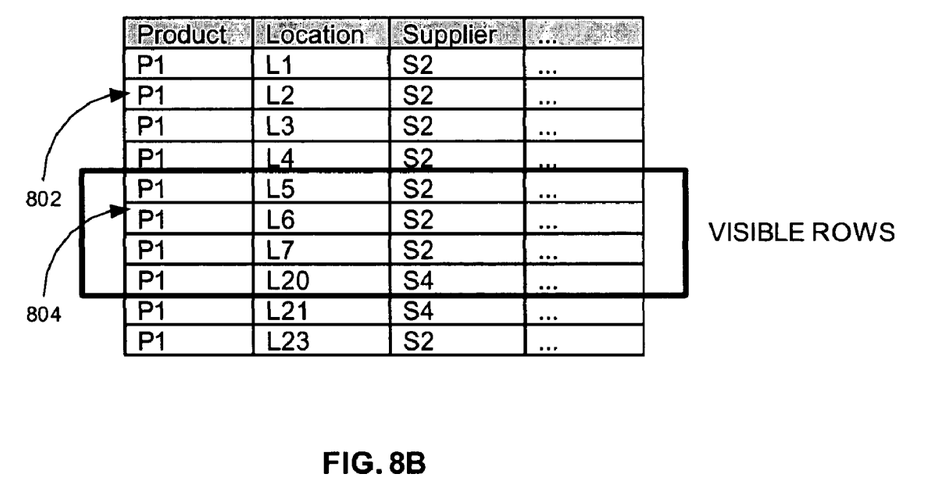

As can be seen from the above, by fetching only a portion of the information matching a user's data query or given selection criteria and an additional portion expected to be accessed next by a user, monitor system 200 may present shortage parts information to the user in real-time. Also, although FIGS. 8A and 8B illustrate fetching and paging through rows of records, it should be understood that columns of records or any other organization of records may similarly be fetched to present shortage part information in real-time. Further, it should be understood that "real-time" as used herein does not only mean instantaneous real-time (e.g., immediate response by monitor system 200), but includes nearly instantaneous real-time, substantially real-time, and user-perceived real-time responses by monitor system 200.

One of ordinary skill in the art will appreciate that features and principles of the present invention may be implemented in a computer readable medium (e.g., floppy disk, CD-ROM, storage device, etc.) containing instructions for a system, such as monitor system 200, to execute the instructions.

The embodiments and aspects of the invention set forth above are only exemplary and explanatory. They are not restrictive of the invention as claimed. Other embodiments consistent with features and principles are included in the scope of the present invention.

In the foregoing description, various features are grouped together for purposes of streamlining the disclosure. This method of disclosure is not to be interpreted as reflecting an intention that the claimed invention requires more features than are expressly recited in each claim. Rather, as the following claims reflect, inventive aspects may lie in fewer than all features of a single foregoing disclosed embodiment. Thus, the following claims are hereby incorporated into this description, with each claim standing on its own as a separate embodiment of the invention.

What is claimed is:

1. A method for presenting data in a monitoring system, the method comprising:

receiving a data query associated with a plurality of stored records;

presenting a first record set of the plurality of stored records in response to the received data query, the first record set comprising records associated with at least one of a first part monitored by the monitoring system, a first location of the first part, or a first supplier of the first part;

fetching a second record set from the plurality of stored records before receiving a request to present the second record set, the second record set comprising records associated with at least one of a second part monitored by the monitoring system, a second location, or a second supplier, wherein the second record set is fetched substantially in parallel with the presentation of the first record set and in anticipation of receiving the request to present the second record set;

receiving the request to present the second record set;

determining, in response to the received request, whether the second record set is outdated, wherein the determining comprises:

calculating a time period between the receipt of the data query and the receipt of the request to present the second record set; and determining that the second record set is outdated when the calculated time period exceeds a threshold value;

fetching an updated version of at least one record of the second record set from the plurality of stored records, when the second record set is outdated, wherein the updated version of the at least one record in the second record set is fetched substantially in parallel with the receipt of the request to present the second record set; and presenting the second record set in response to receiving the request, wherein the presented second record set comprises the updated version of the at least one stored record.

2. The method according to claim 1, wherein presenting the first record set includes displaying at least a portion of the first record set as a current page.

3. The method according to claim 1, wherein presenting the records of the second record set includes displaying at least a portion of the records of the second record set as a next page.

4. The method according to claim 1, wherein presenting the second record set includes displaying at least a portion of the records of the second record set as a previous page.

5. The method according to claim 2, wherein presenting the second record set includes displaying at least a portion of the records of the second record set as at least one of a previous line item before the current page and a next line item after the current page.

6. The method according to claim 1, wherein a record in the first record set includes at least one of a supplier identification, a part identification, a part description, a part location, a part order status, a number of backorder lines, a number of backorder pieces, a number of emergency order lines, or a number of emergency order pieces.

7. The method according to claim 1, wherein fetching the second record set comprises fetching the second record set from at least one database.

8. The method according to claim 1, wherein fetching comprises fetching the second record set from a plurality of databases.

9. The method according to claim 1, further comprising using, as the data request, a scroll command for a scrolling window.

10. The method according to claim 1, further comprising using, as the data request, at least one of a next page command or a previous page command from a user.

11. The method according to claim 1, wherein fetching further comprises fetching the second record set asynchronously with receiving the data query.

12. A monitoring system for presenting data in real-time, the system comprising:

a processor; and
   a memory,
   wherein the processor and the memory are configured to perform a method comprising:

receiving a data query associated with a plurality of stored records;

presenting a first record set of the plurality of stored records in response to the received data query, the first record set comprising records associated with at least one of a first part monitored by the monitoring system, a first location, or a first supplier;

fetching a second record set from the plurality of stored records before receiving a request to present the second record set, wherein:

the second record set comprises records associated with at least one of a second part monitored by the monitoring system, a second location of the first part, or a second supplier of the first part; and the second record set is fetched substantially in parallel with the presentation of the first record set and in anticipation of receiving the request to present the second record set;

receiving the request to present the second record set;

determining, in response to the received request, whether the second record set is outdated, wherein the determining comprises:

calculating a time period between the receipt of the data query and the receipt of the request to present the second record set; and determining that the second record set is outdated when the calculated time period exceeds a threshold value;

fetching an updated version of at least one record of the second record set from the plurality of stored records, when the second record set is outdated, wherein the updated version of the at least one record in the second record set is fetched substantially in parallel with the receipt of the request to present the second record set; and presenting the second record set in response to receiving the request, wherein the presented second record set comprises the updated version of the at least one stored record.

13. The monitoring system according to claim 12, wherein a record in the first record set includes at least one of a supplier identification, a part identification, a part description, a part location, a part order status, a number of backorder lines, a number of backorder pieces, a number of emergency order lines, or a number of emergency order pieces.

14. A computer-readable storage medium containing instructions to configure a monitoring system to perform a method for presenting data in real-time, the method comprising:

receiving a data query associated with a plurality of stored records;

presenting a first record set of the plurality of stored records in response to the received data query, the first record set comprising records associated with at least one of a first part monitored by the monitoring system, a first location of the first part, or a first supplier of the first part;

fetching a second record set from the plurality of stored records before receiving a request to present the second record set, wherein:
the second record set comprises records associated with at least one of a second part monitored by the monitoring system, a second location, or a second supplier; and
the second record set is fetched substantially in parallel with the presentation of the first record set and in anticipation of receiving the request to present the second record set;

receiving the request to present the second record set;

determining, in response to the received request, whether the second record set is outdated, wherein the determining comprises:
calculating a time period between the receipt of the data query and the receipt of the request to present the second record set; and
determining that the second record set is outdated when the calculated time period exceeds a threshold value;

fetching an updated version of at least one record of the second record set from the plurality of stored records, when the second record set is outdated, wherein the updated version of the at least one record in the second record set is fetched substantially in parallel with the receipt of the request to present the second record set; and presenting the second record set in response to receiving the request, wherein the presented second record set comprises the updated version of the at least one stored record.

15. The computer-readable storage medium according to claim 14, wherein a record in the first record set includes at least one of a supplier identification, a part identification, a part description, a part location, a part order status, a number of backorder lines, a number of backorder pieces, a number of emergency order lines, or a number of emergency order pieces.

16. A user interface, comprising:

a selection area for requesting a first record set of a plurality of stored records, the first record set comprising records associated with at least one of a first part monitored by a monitoring system, a first location of the first part, or a first supplier of the first part;

a results area for displaying the requested first record set;

means for fetching a second record set from the plurality of stored records before receiving a request to display the second record set, wherein:
the second record set comprises records associated with at least one of a second part monitored by the monitoring system, a second location, or a second supplier; and
the second record set is fetched substantially in parallel with the display of the first record set in the results area and in anticipation of request for the second record set;

means for receiving the request to display the second record set after the first record set has been fetched for display in the results area by the monitoring system;

means for determining, in response to the received request, whether the second record set is outdated, wherein the means for determining comprising:
means for calculating a time period between the receipt of the data query and the receipt of the request to present the second record set; and
means for determining that the second record set is outdated when the calculated time period exceeds a threshold value; and means for fetching an updated version of at least one record of the second record set from the plurality of stored records, when the second record set is outdated, wherein:
the second record set is displayed in the results area in response to receiving the request;
the presented second record set comprises the updated version of the at least one stored record; and
the updated version of the at least one record in the second record set is fetched substantially in parallel with the receipt of the request to present the second record set.

17. The user interface according to claim 16, wherein the means for making the data request includes a scroll bar.

18. The user interface according to claim 16, wherein the means for making the data request includes at least one of a previous page button and a next page button.

19. A system for presenting data in real-time, the system comprising:

means for receiving a data query associated with a plurality of stored records;

means for presenting a first record set of the plurality of stored records in response to the received data query, the first record set comprising records associated with at least one of a first part monitored by the monitoring system, a first location of the first part, or a first supplier of the first part;

means for fetching a second record set from the plurality of stored records before receiving a request to present the second record set, wherein:
the second record set is associated with at least one of a second part monitored by the monitoring system, a second location, or a second supplier; and the second record set is fetched substantially in parallel with the presentation of the first record set and in anticipation of receiving the request to present the second record set;

means for receiving the request to present the second record set;

means for determining, in response to the received request, whether the second record set is outdated, wherein the means for determining comprises:

means for calculating a time period between the receipt of the data query and the receipt of the request to present the second record set; and means for determining that the second record set is outdated when the calculated time period exceeds a threshold value;

means for fetching an updated version of at least one record of the second record set from the plurality of stored records, when the second record set is outdated, wherein the updated version of the at least one record in the second record set is fetched substantially in parallel with the receipt of the request to present the second record set; and means for presenting the second record set in response to receiving the request, wherein the presented second record set comprises the updated version of the at least one stored record.

20. A method for presenting data in a computer system, the method comprising:

receiving a data query associated with a plurality of stored records;

presenting a first record of the plurality of stored records in response to the received data query, wherein the first record includes at least one of a first part, a first location, or a first supplier;

fetching a second record from the plurality of stored records before receiving a request to present the second record, wherein:

the second record includes at least one of a second part, a second location, or a second supplier; and the second record is fetched substantially in parallel with the presentation of the first record and in anticipation of receiving the request to present the second record; and receiving the request to present the second record set;

determining, in response to the received request, whether the second record set is outdated, wherein the determining comprises:

calculating a time period between the receipt of the data query and the receipt of the request to present the second record set; and determining that the second record set is outdated when the calculated time period exceeds a threshold value;

fetching an updated version of at least one record of the second record set from the plurality of stored records, when the second record set is outdated, wherein the updated version of the at least one record in the second record set is fetched substantially in parallel with the receipt of the request to present the second record set; and presenting the second record in response to receiving the request, wherein the presented second record set comprises the updated version of the at least one stored record.

21. The method of claim 20, further comprising:

defining the first part as different than the second part, wherein the first record includes at least the first part and the second record includes at least the second part.

22. The method of claim 20, further comprising:

defining the first part as the same as the second part, wherein the first record includes at least the first part and the second record includes at least the second part.

23. A monitoring system for presenting data, the system comprising:

a processor; and a memory, wherein the processor and the memory are configured to perform a method comprising:

receiving a data query associated with a plurality of stored records;

presenting a first record of a plurality of stored records in response to the received data query, wherein, the first record includes at least one of a first part, a first location, or a first supplier;

fetching a second record from the plurality of stored records before receiving a request to present the second record, wherein:

the second record includes at least one of a second part, a second location or a second supplier; and the second record is fetched substantially in parallel with the presentation of the first record and in anticipation of receiving the request to present the second record;

receiving the request to present the second record set;

determining, in response to the received request, whether the second record set is outdated, wherein the determining comprises:

calculating a time period between the receipt of the data query and the receipt of the request to present the second record set; and determining that the second record set is outdated when the calculated time period exceeds a threshold value;

fetching an updated version of at least one record of the second record set from the plurality of stored records, when the second record set is outdated, wherein the updated version of the at least one record in the second record set is fetched substantially in parallel with the receipt of the request to present the second record set; and presenting the second record in response to receiving the request, wherein the presented second record set comprises the updated version of the at least one stored record.

24. A computer-readable storage medium storing instructions to configure a data processor to perform a method for presenting data, the method comprising:

receiving a data query associated with a plurality of stored records;

presenting a first record of the plurality of stored records in response to the received data query, wherein the first record includes at least one of a first part, a first location, or a first supplier;

fetching a second record from the plurality of stored records before receiving a request to present the second record, wherein:

the second record includes at least one of a second part, a second location, or a second supplier; and the second record is fetched substantially in parallel with the presentation of the first record and in anticipation of receiving the request to present the second records;

receiving the request to present the second record set;

determining, in response to the received request, whether the second record set is outdated, wherein the determining comprises:

calculating a time period between the receipt of the data query and the receipt of the request to present the second record set; and determining that the second record set is outdated when the calculated time period exceeds a threshold value;

fetching an updated version of at least one record of the second record set from the plurality of stored records, when the second record set is outdated, wherein the updated version of the at least one record in the second record set is fetched substantially in parallel with the receipt of the request to present the second record set; and presenting the second record in response to receiving the request, wherein the presented second record set comprises the updated version of the at least one stored record.

25. A method for presenting data in a monitoring system in real-time, the method comprising:

receiving a data query associated with a plurality of stored records;

presenting a first record set of the plurality of stored records in response to the received data query in a monitoring system;

fetching a second record set from the plurality of stored records before receiving a request to present the second record set, the second record set comprising a more current version of at least one record in the first record set, wherein the second record set is fetched substantially in parallel with the presentation of the first record set and in anticipation of receiving the request to present the second record set;

receiving the request to present the second record set;

determining, in response to the received request, whether the second record set is outdated, wherein the determining comprises:

calculating a time period between the receipt of the data query and the receipt of the request to present the second record set; and determining that the second record set is outdated when the calculated time period exceeds a threshold value;

fetching an updated version of at least one record of the second record set from the plurality of stored records, when the second record set is outdated, wherein the updated version of the at least one record in the second record set is fetched substantially in parallel with the receipt of the request to present the second record set; and presenting the second record set in response to receiving the request, wherein the presented second record set comprises the updated version of the at least one stored record.

26. The method of claim 25, further comprising determining whether a record in the first record set is current according to a timestamp associated with the first record set.

27. The method according to claim 26, wherein fetching the second record set occurs when the record in the first record set is not current.

28. A system for presenting data in a monitoring system in real-time, the system comprising:

a processor; and a memory, wherein the processor and the memory are configured to perform a method comprising:

receiving a data query associated with a plurality of stored records;

presenting a first record set of the plurality of stored records in response to received data query in a monitoring system;

fetching a second record set from the plurality of stored records before receiving a request to present the second record set, the second record set comprising a more current version of at least one record in the first record set, wherein the second record set is fetched substantially in parallel with the presentation of the first subset and in anticipation of receiving the request to present the second record set; and receiving the request to present the second record set;

determining, in response to the received request, whether the second record set is outdated, wherein the determining comprises:

calculating a time period between the receipt of the data query and the receipt of the request to present the second record set; and determining that the second record set is outdated when the calculated time period exceeds a threshold value;

fetching an updated version of at least one record of the second record set from the plurality of stored records, when the second record set is outdated, wherein the updated version of the at least one record in the second record set is fetched substantially in parallel with the receipt of the request to present the second record set; and presenting the second record set in response to receiving the request, wherein the presented second record set comprises the updated version of the at least one stored record.

29. A computer-readable storage medium containing instructions to configure a system to perform a method for presenting data in real-time, the method comprising:

receiving a data query associated with a plurality of stored records;

presenting a first record set of the plurality of stored records in response to the received data query in a monitoring system;

fetching a second record set from the plurality of stored records before receiving a request to present the second record set, the second record set comprising a more current version of at least one record in the first record set, wherein the second record set is fetched substantially in parallel with the presentation of the first record set and in anticipation of receiving the request to present the second record set;

receiving the request to present the second record set;

determining, in response to the received request, whether the second record set is outdated, wherein the determining comprises:

calculating a time period between the receipt of the data query and the receipt of the request to present the second record set; and determining that the second record set is outdated when the calculated time period exceeds a threshold value;

fetching an updated version of at least one record of the second record set from the plurality of stored records, when the second record set is outdated, wherein the updated version of the at least one record in the second record set is fetched substantially in parallel with the receipt of the request to present the second record set; and presenting the second record set in response to receiving the request, wherein the presented second record set comprises the updated version of the at least one stored record.

\* \* \* \* \*